United States Patent [19]

Amberg et al.

[11] 4,265,357
[45] May 5, 1981

[54] ARTICLE INFEED GATE AND CONTROL THEREFOR

[75] Inventors: Stephen W. Amberg; Clyde F. Hadl, both of Toledo, Ohio

[73] Assignee: Owens-Illinois, Inc., Toledo, Ohio

[21] Appl. No.: 786,741

[22] Filed: Apr. 11, 1977

[51] Int. Cl.³ .............................................. B65G 47/26
[52] U.S. Cl. .................................. 198/460; 198/466; 198/475; 198/572
[58] Field of Search ............... 198/444, 459, 460, 461, 198/465, 466, 469, 475, 572, 491; 156/351, 352

[56] References Cited

U.S. PATENT DOCUMENTS

| 2,630,904 | 3/1953 | Bozek | 198/459 |
|---|---|---|---|
| 2,890,787 | 6/1959 | Carter | 198/459 |
| 2,909,017 | 10/1959 | Eddison et al. | 198/460 |
| 3,004,650 | 10/1961 | Pettee | 198/459 |
| 3,026,991 | 3/1962 | Kinsley | 198/459 |
| 3,036,624 | 5/1962 | Carter | 198/461 |
| 3,095,960 | 7/1963 | Luginbuhl | 198/444 |
| 3,315,782 | 4/1967 | Eldred | 198/444 |
| 3,322,596 | 5/1967 | Vergobbi et al. | 198/444 |
| 3,607,547 | 9/1971 | Kronseder | 156/351 |
| 3,738,891 | 6/1973 | Pusching | 156/352 |

Primary Examiner—Joseph E. Valenza
Attorney, Agent, or Firm—John R. Nelson; Myron E. Click; David H. Wilson

[57] ABSTRACT

There is disclosed apparatus for feeding articles, such as bottles, for example, to a machine and includes a conveyor advancing articles past a gate member and into an infeed worm which times and spaces the articles properly for introduction to the machine. The articles are accumulated upstream of the worm on the conveyor and the accumulation detected by a sensor means. The gate is extendable across the conveyor to close and arrest the bottles when an insufficient supply accumulation is sensed. When a sufficient article accumulation occurs, the sensor means enables the gate to retract or open. The opening of the gate is timed by a first proximity switch in circuit with the sensor means so that articles which first pass the gate will be synchronized with the worm and enter it smoothly. If and when articles are in short supply, the sensor means signals to close the gate for again accumulating them. The timing of closing the gate is achieved by a second proximity switch which closes the gate between articles and avoids striking them.

1 Claim, 4 Drawing Figures

ARTICLE INFEED GATE AND CONTROL THEREFOR

The present invention relates to conveying articles to a machine in which a build-up of a supply of the articles is needed to continuously feed the machine without any gaps in the supply. More particularly, the invention concerns an automatically controlled device on the infeed conveyor of the machine regulating the flow of articles in the supply to assure that the machine is fed a continuous and uninterrupted succession of articles when in operation.

BACKGROUND OF THE INVENTION

There is disclosed in U.S. Pat. No. 4,013,496 a bottle labelling machine to which this invention is adaptable. The labelling machine receives bottles from an infeed supply which are loaded into a pocketed turret. The pockets on the turret align the bottles under a mandrel thereon to receive the label in the form of a hollow cylindrical sleeve that is formed on the mandrel. It is desired to maintain the pockets of the turret full with bottles when the machine is in operating mode, and to stop the infeed of bottles entirely when the supply thereof is low or the machine is in an idle or non-operating mode. If bottles are allowed to go through the machine at random, the output is unreliable in that some bottles may not receive a label if the machine is temporarily at idle or is non-operating; and, if the machine is in operating mode, the mandrels will produce a succession of labels and some will be discharged into the turret (there being no bottle there) and a waste of material and labels will result.

SUMMARY OF THE INVENTION

The present invention provides a controlled infeed to the machine to assure a supply of bottles in uninterrupted spacing for the machine when the latter is operating.

The apparatus includes an infeed conveyor in combination with a timing and spacing worm for loading the machine. Along the infeed conveyor there is a gate, preferably directly ahead of the worm, which is actuated across the path of the infeed conveyor to arrest the bottles moving into the worm. The gate may be otherwise actuated and withdrawn from the infeed path to allow bottles to flow into the infeed worm.

The gate is under the control of sensors along the infeed conveyor on the upstream side which determines the supply of bottles in anticipation of operation of the gate. Once the sensor input determines a condition for either opening or closing the gate, the control for the gate actuating means is synchronized with the screw lands of the worm or between two of the bottles, depending on whether the gate opens to infeed the line of bottles or the gate closes to halt the oncoming procession of bottles. Both synchronizing aspects of the bottle gate are with the purpose of avoiding bottle abuse and surface damage.

Specifically, the gate is actuated by a reciprocating air-cylinder motor that is under control of a solenoid-operated reversing valve. The circuit for the solenoid includes a photoelectric switch means along the conveyor upstream of the gate. The switch means closes when the cell of the switch is dark. When the solenoid is energized, the valve operates the air-cylinder for opening the gate. To initiate either an opening or closing movement of the gate by the air-cylinder motor, the sensor switches determine the need for such movement and are under control of two proximity switches that are phased with the rotation of the worm. These proximity switches determine the precise moment when the air-cylinder valve is to be operated by its solenoid, thereby synchronizing the position of the worm and the actuation of the gate. The gate is physically attached to the conveyor a selected distance from the first land or pocket of the worm. By this known quantity and the velocity of conveyor movement, the time of release of the accumulated bottles behind the gate will synchronize the first bottle into the worm. Also, with an edge-to-edge line of bottles depending upstream from the worm and the upstream distance of the gate known, the closing of the gate between two bottles with minimum contact or impact thereon is determined from the rotary position of the worm. Accordingly, the two proximity switches in the control circuit are operated in response to the rotation of the worm and its rotary position.

The principal purpose of the gate is for the accumulation of bottles at the infeed. The amount of the accumulation is regulated by a photoelectric cell or cells along the conveyor upstream of the gate. When an accumulation of bottles occurs, each of the photoelectric cells is darkened enabling the gate to open, i.e. operates the solenoid-operated air cylinder to withdraw the gate member. However, timing of the opening movement by the air cylinder is also controlled by a first proximity switch telling the gate when to open so that the bottles moving past the gate will be synchronized with the feed screw on the worm and the bottles will enter the lead-in pocket of the latter smoothly. If and when the containers stop coming on the conveyor supply, the photoelectric eye signals to close the gate for again accumulating bottles. The solenoid receives its signal but again is controlled in its time to close the gate by a second proximity switch which tells the gate to close at a point between two adjacent bottles and not on or against the body of any one of the bottles.

Various modifications will undoubtedly occur to those skilled in the art upon reference to the preferred embodiment herein disclosed; however, the disclosed embodiment is in no way intended as limiting the invention beyond the scope set out in the appended claims.

DESCRIPTION OF THE INVENTION

Figure 1:
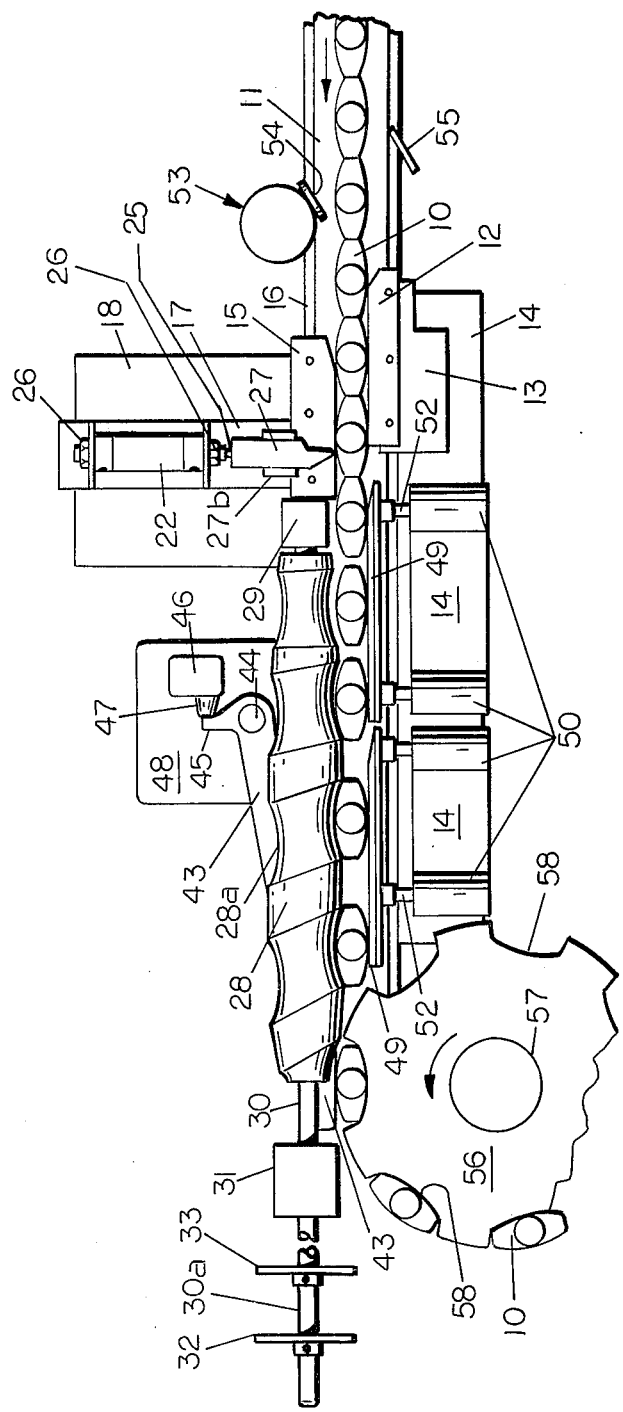
FIG. 1 is a top plan view of the bottle feed section of a bottle handling machine, such as a labelling machine, including the controlled bottle gate mechanism of the present invention.
Figure 2:
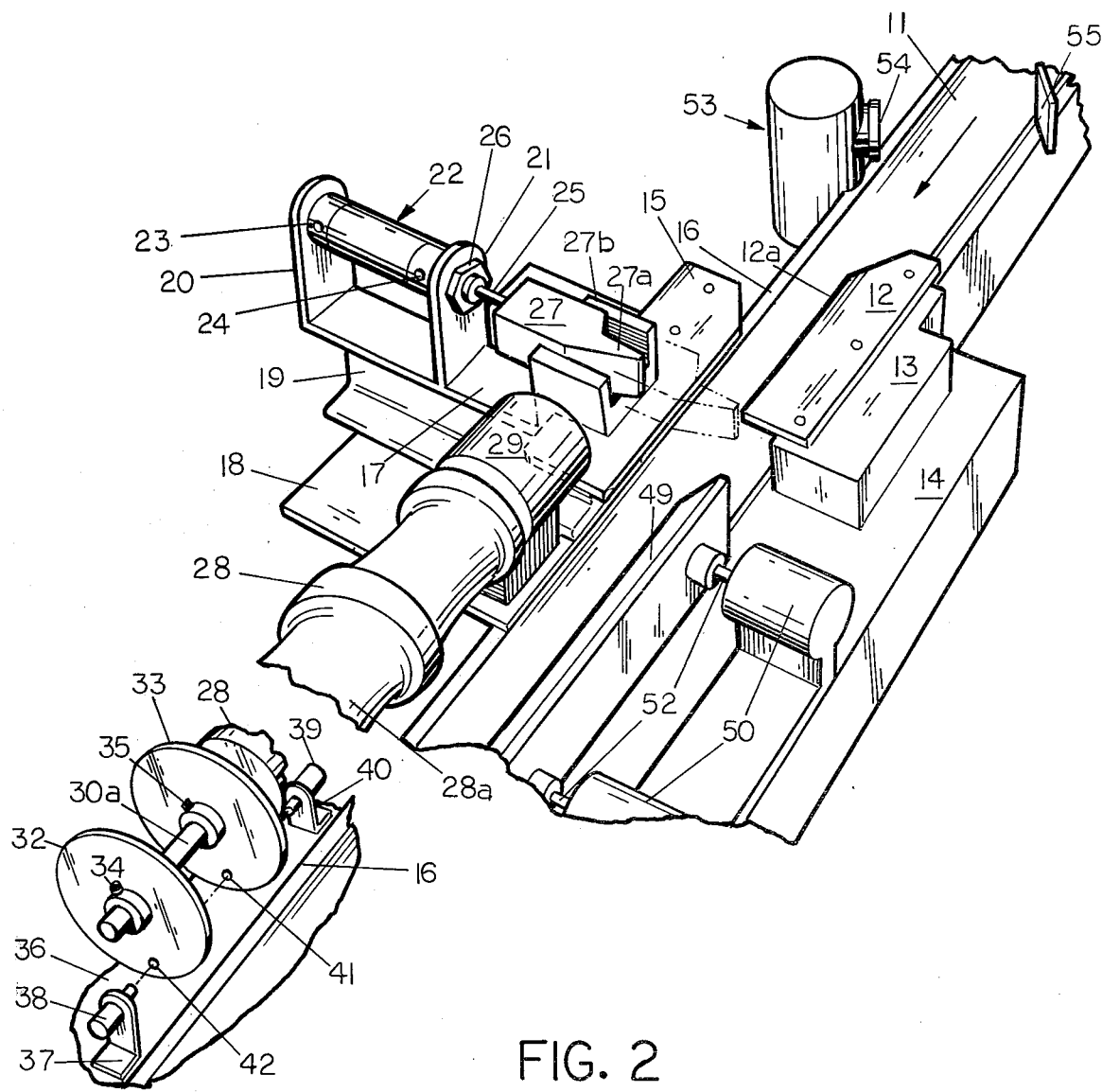
FIG. 2 is a perspective view of the bottle gate and controlled mechanism for its operation.

The drawings represent a preferred embodiment of the invention in which a seriatim supply of articles, such as the glass bottles 10, are supported in an upright fashion on a top horizontal run of a powered infeed conveyor 11, driven from right to left on FIG. 1. The row of bottles 10 is advanced along a stationary side rail 12 fastened to a support block 13 on the side frame 14 of the conveyor. On the opposite side of the conveyor a stationary side rail 15 is fastened onto the side frame member 18 attached to the frame 16 of the conveyor. The rail 15 is included as a part of a plate 17 of the motor support bracket which is supported by a spacer-beam 19 on the flat frame member 18 (FIG. 2) to mount the rail 15, gate 27 and its motor at the proper operating height.

Side rails 12 and 15 are each relieved at their upstream ends and together they form a throat or infeed path for the bottles. The side rails 12 and 15 are in the form of plates supported at an elevation above the surface of conveyor 11 to engage bottles 10 in their mid-body region and guide them in the line into the article timing means. At the infeed throat there is a gate assembly which comprises gate member 27 attached to the piston rod 25 of reciprocating air-cylinder motor 22. The gate member 27 is preferably wedge-shaped at its forward end 27a and is longitudinally shiftable in the U-block 27b between a retracted, gate-open position (solid outline on FIGS. 1 and 2) and an extended, gate-closed position (phantom outline on FIG. 2). Cylinder motor 22 is supported by the vertical upright brackets 20, 21 integrally attached to the horizontal plate member 17 which supports the motor, gate and U-block and serves as the near side rail.

The air-cylinder motor 22 has air line connections (not shown) into cylinder ports 23 and 24 at the opposite ends of the cylinder. The end ports receive conduits from a conventional solenoid-operated motor control valve (not shown). The control valve is conduit connected to a source of pressurized air for reciprocating power operation of the air-cylinder motor 22. The solenoid-operated control valve of the motor is shiftable by a solenoid (to be described hereinafter) to apply pressurized air to either of the end ports. The cylinder of motor 22 is fastened onto the vertical brackets 20, 21 by nuts 26.

Adjacent the gate 27 in the downstream direction of the conveyor is a bottle timing and spacing device in the form of a helical worm element 28 having progressively shorter length pockets 28a formed between the threads. Worm 28 is rotatably supported by a horizontal shaft 30 which is bearing mounted and connected to a motor driven power transmission 29 at one end and a journal bearing 31 at the other. The shaft 30 is driven for advancing the helical thread of the worm 28 from right to left (FIG. 1) and the pockets 28a between the thread of the worm advance in that direction for controlling the advance of the bottles 10 by conveyor 11. The surface velocity of conveyor 11 is some faster than the forward pocket or screw velocity of worm 28 such that, in effect, the threads of the worm retard the advance of the bottles and in this manner space the bottles 10 apart the proper center-to-center distance for tangential infeed into pockets 58 of the machine star wheel 56. Star wheel 56 is supported on a vertical shaft 57 driven by the machine at synchronous speed with the worm. The bottles are under control of the worm as they are loaded into the machine. The action just described also creates an upstream accumulation of the bottles in side-to-side contact in a line supply on conveyor 11. As was pointed out earlier, this line supply accumulation of the articles assures that the machine is loaded without skipping or missing a pocket in the machine.

The machine is kept in operating mode by a control in circuit with a switch 46 that is supported on a horizontal plate 48 along the side frame of the conveyor. At the side of the conveyor and spaced slightly above the top surface thereof is an elongated, shaped switch arm 43 that is pivoted near its one end at a vertical pivot 44 on plate 48. The arm 43 is spring biased so that it is normally extended across the top of conveyor 11 into the path of the bottles moving along worm 28. The bottles are retained in mesh with the thread of worm 28 by a segmented, stationary side rail 49 attached to rods 52 adjustably supported in the several holders 50 on the side frame 14. The side rail 49 defines the linear feed path for the bottles along worm 28 and into the successive pockets 58 of star wheel 56. While advancing in this feed path, bottles 10 successively engage the face of switch arm 43 moving it to a clockwise position. The opposite end of switch arm 43 in the clockwise position includes dog 45 engaging the button 47 of switch 46. The switch controls the machine in a manner disclosed in the copending application of Clyde F. Hadl, et al, Ser. No. 785,634, filed Apr. 7, 1977, and commonly owned with this application. The length of the face on switch arm 43 should be sufficient to simultaneously contact two successive bottles 10 in the infeed path near the terminal end of worm 28 to avoid cycling of the switch 46 and a cycling on-and-off of the machine should one bottle be missed between the successive bottles. It is therefore important to maintain the supply line of bottles full into the worm to avoid skips or voids thereof in the pockets of the worm. The line supply of bottles is controlled by the mechanism to be described.

At some point ahead of the gate 27 is a first sensor which determines a compact line of bottles from the infeed worm to that point. Other sensors may be used in tandem with this first sensor to determine the length of the line supply of bottles in advance of the gate. If the first sensor determines the line supply of bottles is depleted or interrupted, the gate is closed until the line of bottles builds up again to the desired point, i.e. to the other upstream sensor. At this time the gate is opened and production (infeed of bottles) is resumed. The preferred sensor in the invention is a photoelectric switch 53 of conventional type having a light source 54 and photoelectric cell 55 mounted on opposite sides of the conveyor. The switch 53 is of the type that will be normally closed while the cell 55 is darkened and will open the circuit upon the light beam of source 54 striking cell 55. A second photoelectric switch (not shown) may be similarly mounted upstream of switch 53 a predetermined distance to detect the build-up of the line of bottles in the supply to again open gate 27 at a proper time, or the line build-up may be observed and a start switch engaged by an operator. These other sensor switches are later discussed under the category of "Other Contacts" on the circuit of FIG. 3.

In addition to the photoelectric switch 53 in the control circuit for the solenoid of the air motor 22, there are two proximity switches 38 and 39 (FIG. 2) mounted on the frame of the conveyor on brackets 37 and 40, respectively. The switch 38 has its contacts normally "open" and closed by its magnetic target 42; whereas, switch 39 has its contacts normally "closed" and opened by its magnetic target 41. An example of proximity switch which may be employed is Namco Proximity Switch, Series EE950, of Namco Controls, 170 East 131st Street, Cleveland, OH 44108. The proximity switches are placed to sense the rotary position of the worm 28. Two rotary discs 32 and 33 are mounted on a shaft 30a which is an extension of the worm shaft 30, or, in the alternative, may be mechanically connected or synchronously connected to shaft 30 and driven thereby at the same angular phasing and RPM. Discs 32 and 33 are made of a non-conducting dielectric material, such as a phenolic plastic (Bakelite), Lucite, wood laminate, to name but a few examples. The discs 32 and 33 each include a hub which is provided with a set screw (shown at 34 and 35 on FIG. 2) for fastening each disc in place on the shaft 30a. Each disc includes a small metallic (magnetic) target in the form of a circular lug 42 or 41, respectively. The target 42 is mounted in the disc 32 a radial distance from its axis such that the target will pass in front of the magnetic sensor of proximity switch 38 during each revolution of the disc. Similarly, the target 41 is radially displaced from the axis of disc 33 a distance such that it will pass in front of the sensor of proximity switch 39 once every revolution of the disc. The angular position of the lugs 41, 42 may be independently varied by the setscrew adjustments of the discs so as to time the proximity switches corresponding with a position of revolution of the worm 28. This timing is important: first, to assure that the bottles engaged by the worm after the gate is opened will enter the pocket of the worm smoothly at the start of the thread thereon; and, second, to time the closing of the gate member 27 so that the wedge portion 27a thereof is inserted between two adjacent bottles. This timing improves the bottle handling aspects of the apparatus and markedly reduces bottle abuse and damage.

Figure 3:
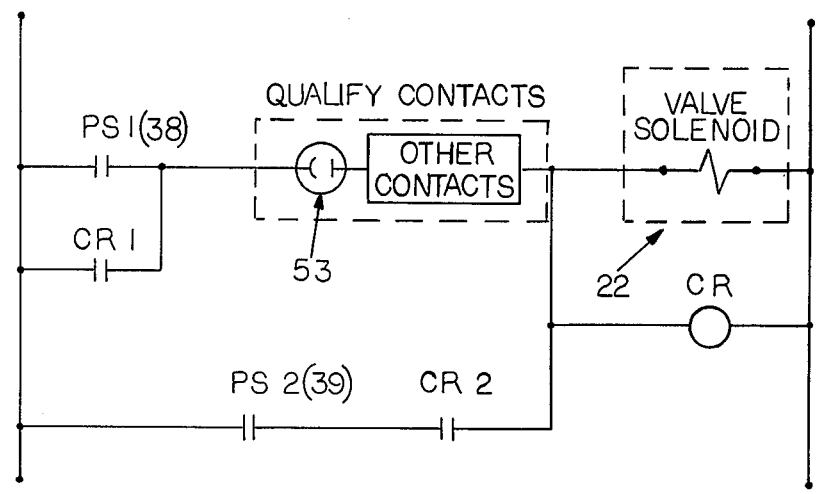
FIG. 3 is an electrical wiring diagram for the control of the bottle gate.

As shown on FIG. 3, the air-cylinder motor 22 is under control of the motor valve solenoid which is in circuit across the power supply with the "Qualify Contacts" (switches) and proximity switch 38. Assuming the gate 27 is closed and bottles are held back and accumulating, to energize the solenoid and open the gate, the cell of photoelectric switch 53 must be darkened by articles accumulated in front of the cell 55 in close, compact order. Also, "Other Contacts", such as a manual start switch and a second photoelectric switch (not shown) sensing a given line build-up of bottles, must be closed for opening gate 27. When these conditions are met the last set of contacts (PS1) in this circuit close when the lug target 42 on the disc 32 is in front of proximity switch 38. The circuit of the valve solenoid is now energized and the air-cylinder motor retracts gate 27 opening the feed of the bottles. The opening is timed with the screw of the worm by the time factor it takes a bottle leaving when the gate opens to enter the front of the worm at the correct position. This is set by adjusting the rotary location of the disc 32 and its target 42 on shaft 30a which is a drive link to the angular phase position of the worm at the time the gate is to open. Included in the circuit is the relay coil CR which is energized at the same time the PS1 contacts and solenoid circuit is closed. Coil CR closes its contacts CR1 connected across the PS1 contacts to hold the circuit "in" during the period for continuing the operation of the device.

At such time as the line of bottles diminishes to open one of the "Qualify Contacts", the gate is closed. It is preferred the upstream photoelectric switch ("Other Contact"), once its cell is illuminated to open that switch, also includes a time delay to allow the bottle line to continue a certain time. This avoids unnecessarily stopping the infeed of articles by a short gap in the line, such as where one article space is empty in the line, etc. The time delay may allow bottles to continue to "run" into the infeed, but only until the cell of photoelectric switch 53 is illuminated. The relay coil CR also includes contacts CR2 which also closed and remain closed after the circuit was energized. The second proximity switch PS2 (39) is normally closed and holds its contacts closed except for the time the target 41 on the disc 33 is aligned with the sensor of proximity switch 39 whereat its contacts are opened momentarily. When relay coil CR is energized, the circuit across the power supply through PS2 and CR2 is closed. However, as the circuit inclusive of CR1, 53 and "Other Contacts" is broken, as in the case of the aforementioned condition, the solenoid circuit remains energized for a short period through PS2 and CR2 (the lower circuit path on FIG. 3) until the contacts of PS2 of proximity switch 39 are opened. This occurs at the instant target 41 is in front of proximity switch 39 which establishes the time of de-energizing the solenoid. At the time the solenoid drops out of the circuit, the valve reverses power on the air-cylinder 22 and extends the gate to "closed" position, i.e. the dotted outline position thereof on FIG. 2. The instant the solenoid circuit is broken is determined by the proximity switch 39. This timing is set by the position of the adjacent edges of two adjacent bottles being in front of gate 27 and is related to the angular position of the worm at that instant. As was stated earlier, the upstream line of bottles (see FIG. 1) is compacted upstream from the worm because the worm lands or threads actually hold back the bottles somewhat from conveyor forward velocity while timing and spacing them in the worm to load them into the machine, i.e. placing bottles 10 one after the other into the pockets 58 of star wheel 56.

Figure 4:
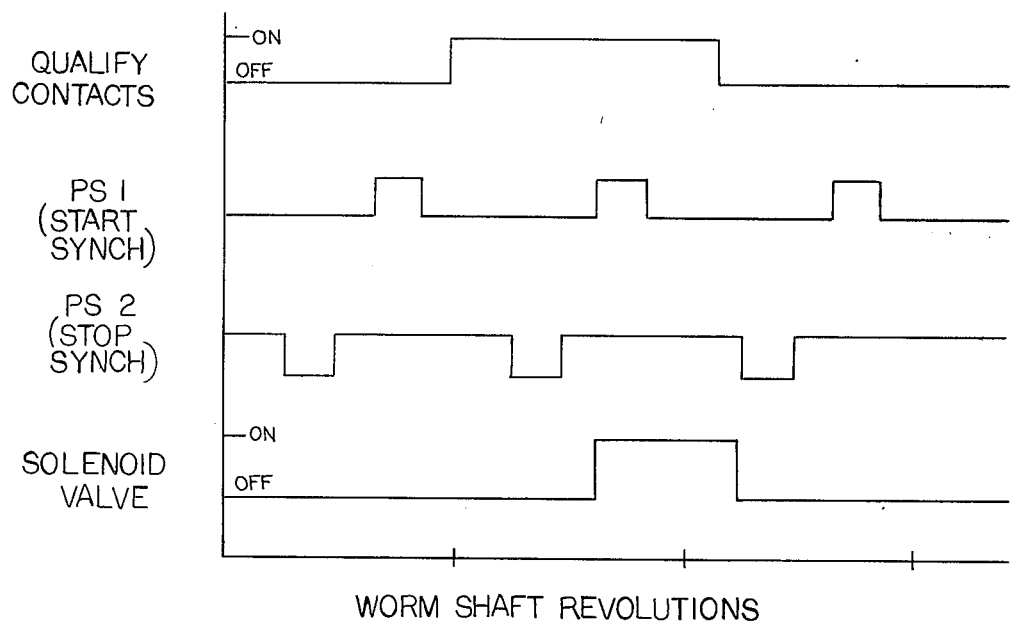
FIG. 4 is a timing chart for the electrical control of the invention.

The control functions are demonstrated by example in the timing chart of FIG. 4. The first function "Qualify Contacts" is shown collectively in the "on" mode at the first marked revolution of the worm shaft. At some point in the next revolution of the shaft thereafter, PS1 (START SYNCH) cycles "on"–"off"; and the SOLENOID VALVE at that point of shaft rotation goes from "off" to "on". To simplify the illustration and timing chart, one of the "QUALIFY CONTACTS" is shown as going "OFF" (opening) just after the next shaft revolution. This is slightly ahead of the "off"–"on" cycle of PS2 (STOP SYNCH). When the next PS2 cycle occurs, the SOLENOID VALVE goes from "ON" to "OFF". The chart is compacted to illustrate the operation. An infinite number of shaft revolutions may occur between the time the solenoid is switched from "on" to "off".

The foregoing illustrates the invention controlling infeed operation and timing the opening and closing of the gate regulating the infeed supply of articles. The timing feature of the control contributes to the smooth handling of articles, such as bottles, with minimum abuse and damage and fulfilling the demands of a machine for a continuous supply of articles without skips or voids in the supply.

Having described a preferred embodiment of the invention, other and further modifications thereof may be resorted to without departing from the spirit and scope of the invention set forth in the appended claims.

What is claimed is:

1. An article handling mechanism comprising a driven conveyor having a rotary infeed worm rotatably supported by a horizontal shaft controlling movement of articles into a machine for treating articles, said infeed worm having an inlet receiving said articles and an outlet advancing them into said machine at equal spacings, said conveyor advancing said articles to said worm inlet and adapted for accumulating said articles upstream of said worm, a gate adjacent the inlet of said worm for controlling the supply of articles thereto comprising a wedge-shaped gate member supported for reciprocating movement laterally of the conveyor into and out the path of articles thereon, a reciprocating fluid-operated motor connected to actuate said gate member between an extended position into the path of articles for arresting their movement to the inlet of said worm and a retracted position for feeding articles thereto, said motor being operatively connected to a solenoid for regulating its said reciprocating movement, and means connected to the solenoid for causing operation of said motor in response to said accumulated articles comprising an electric energizing circuit connected to said solenoid for energizing the latter, at least one circuit closing qualifying contact in series in said circuit comprising a photoelectric switch device positioned across the conveyor upstream of said gate member and in the proximity thereof enabling actuation of said gate member to its retracted position by presence of articles on the conveyor opposite said switch device and actuation to its extended position when there are no articles opposite said switch device, the energizing circuit de-energizing the solenoid by insufficient upstream articles to cause said gate member to be moved to its extended position, and said qualifying contact being operable for energizing the solenoid by the presence of articles upstream of said gate member to cause it to be moved to its retracted position, and switch means in said energizing circuit and connected to the shaft of said rotary infeed worm operable for opening or closing said circuit at a predetermined point during a revolution of said shaft and synchronizing actuation of said gate member to its said extended and retracted positions, respectively, corresponding with a rotary position of said infeed worm, said switch means comprising plural proximity switches in circuit with said photoelectric switch and closed in response to a predetermined rotary position of the worm during each revolution for closing and opening said energizing circuit thereby synchronizing motor actuation to retract and extend said gate member so as to (a) retract said member responsive to rotational position of said rotary infeed worm to smoothly receive an article on the worm, and (b) extend said member for inserting it between adjacent articles passing in front of it.

* * * * *